(12) United States Patent
Zapletal

(10) Patent No.: US 9,921,715 B2
(45) Date of Patent: Mar. 20, 2018

(54) VISUAL REPRESENTATION OF NETWORK-DISCOVERED COMPONENTS

(71) Applicant: Red Hat, Inc., Raleigh, NC (US)

(72) Inventor: Lukas Zapletal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 463 days.

(21) Appl. No.: 14/632,831

(22) Filed: Feb. 26, 2015

(65) Prior Publication Data

US 2016/0253069 A1    Sep. 1, 2016

(51) Int. Cl.
*G06F 3/0481* (2013.01)
*H04L 12/751* (2013.01)
*H04L 29/08* (2006.01)
*H04L 29/12* (2006.01)

(52) U.S. Cl.
CPC .......... *G06F 3/04817* (2013.01); *H04L 45/02* (2013.01); *H04L 67/36* (2013.01); *H04L 61/6004* (2013.01); *H04L 61/6022* (2013.01)

(58) Field of Classification Search
CPC .................................................. G06F 3/0481
See application file for complete search history.

(56) References Cited

U.S. PATENT DOCUMENTS

| | | | |
|---|---|---|---|
| 6,646,656 B1 | 11/2003 | Walker et al. | |
| 2002/0083123 A1 | 6/2002 | Freedman et al. | |
| 2008/0285469 A1* | 11/2008 | Toda | H04L 12/5692 370/244 |
| 2011/0063098 A1* | 3/2011 | Fischer | G07C 9/00119 340/439 |
| 2012/0256738 A1 | 10/2012 | Egawa | |
| 2014/0210843 A1* | 7/2014 | VanCuren, Jr. | G06T 11/001 345/589 |
| 2016/0087887 A1* | 3/2016 | Fung | H04L 49/3009 370/401 |
| 2016/0112278 A1* | 4/2016 | Sangli | G06F 3/0484 715/736 |

(Continued)

FOREIGN PATENT DOCUMENTS

| | | |
|---|---|---|
| CN | 102098351 | 6/2011 |
| JP | 2006211200 | 8/2006 |

(Continued)

OTHER PUBLICATIONS https://github.com/whoojemaflip/autonic/blob/master/README.md.
https://www.wireshark.org/docs/wsug_html_chunked/ChAdvNameResolutionSection.html.
https://forums.ruckuswireless.com/ruckuswireless/topics/mac_address_to_device_name_table.

*Primary Examiner* — David Choi
(74) *Attorney, Agent, or Firm* — Lowenstein Sandler LLP

(57) ABSTRACT

Systems and methods to generate and provide a user interface to display a shape-based icon that visually represents a server in a user interface. An example method may include identifying a media access control (MAC) address associated with a server, the MAC address including a vendor identifier and a server identifier; determining a first color in view of the vendor identifier and a second color in view of the server identifier; determining a first shape in view of the vendor identifier and a second shape in view of the server identifier; generating a shape-based icon comprising the first shape having the first color and the second shape having the second color; and providing the user interface to display the shape-based icon that visually represents the server.

20 Claims, 5 Drawing Sheets

(56) References Cited

U.S. PATENT DOCUMENTS

2016/0241600 A1\* 8/2016 Khan .................... H04L 63/306
2016/0253069 A1\* 9/2016 Zapletal ................. H04L 67/36
                                                             715/733

FOREIGN PATENT DOCUMENTS

JP      2008227931      9/2008
WO      2010127610     11/2010

\* cited by examiner

FIG. 4
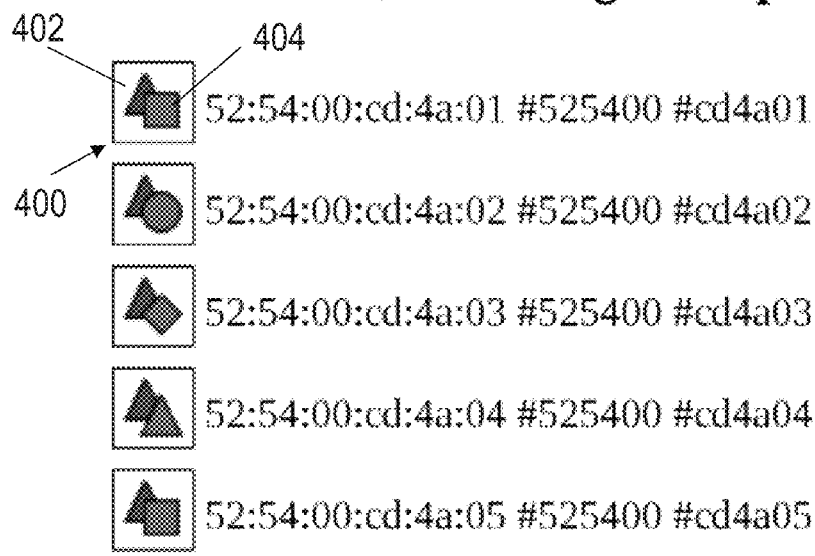

VISUAL REPRESENTATION OF NETWORK-DISCOVERED COMPONENTS

TECHNICAL FIELD

The present disclosure is generally related to a network management system, and is more specifically related to systems and methods to visually represent network-discovered components.

BACKGROUND

A network management system includes tools to deploy, update, monitor, and manage various physical and virtual components and systems in a networked computing environment. Certain network management systems include an administrative component configured to automatically discover newly provisioned components (e.g., servers) over a network and add them to an associated registry (e.g., a server registry). Each of the discovered servers is represented by a media access control (MAC) address. In a management interface used by operators of the system, each of the discovered servers is assigned a unique name based on the server's MAC address. The MAC address-based server names are visually non-intuitive and fail to communicate meaningful information about the server to the operator. Since server operators are tasked with managing tens and hundreds of thousands of servers, navigation and readable of the user interface is difficult and error-prone.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4 depicts an example user interface providing multiple shape-based icons representing respective servers of a network computer system, in accordance with one or more aspects of the present disclosure.

DETAILED DESCRIPTION

Described herein are methods and systems including a network management system configured to manage multiple network-discoverable computing components (e.g., servers) in a network computing environment. The network management system generates a shape-based icon to visually represent each server via a user interface accessible by an operator of the network management system. According to implementations of the present disclosure, the network management system may display the shape-based icon or send a user interface document (e.g., a web page) to another computing device (e.g., an administrator's console) for display to a user (e.g., an administrator).

Certain conventional implementations include a network manager to discover newly provisioned servers over a network and add them to a registry. Each server is represented by its MAC address which is in the form of AA:BB:CC:DD:EE:FF, wherein each character is selected from the hexadecimal character space including 0-9 and A-F). The discovered servers send information about the server (e.g., a primary MAC address in the event the server includes multiple network interface cards (NICs)) and awaits further instructions (e.g., an instruction to initiate an operating system installation).

For example, a company named ACME Corporation may manage multiple servers having names based on the MAC address, such as: mac3c970eb13eb7.lab1.acme.com; mac52540060a72b.lab1.acme.com; and mac52540000f275.lab1.acme.com. The operator of the example system may manage a large number of servers having names such as the above, making navigation via the user interface confusing, inefficient, and highly susceptible to human error. For example, in certain cases, an operator may rename a server to any random or user-selected name (e.g., server 893, server 894, etc.). However, in large environments, irrespective of the employed naming convention, management of the servers is prone to human error.

Aspects of the present disclosure address the above noted and other deficiencies by providing methods and systems including a networking management system configured to generate an icon to visually represent a server in a user interface accessible by an operator. In an implementation, the icon is a shape-based icon including multiple shapes (e.g., triangle, square, circle, diamond, etc.) filled with a color. Advantageously, the shape-based icon visually represents and conveys information about the server (herein referred to as "server information"). According to implementations of the present disclosure, the server information may include, but is not limited to, a vendor associated with the server and information identifying a specific network interface controller (NIC) associated with the server.

Figure 3:
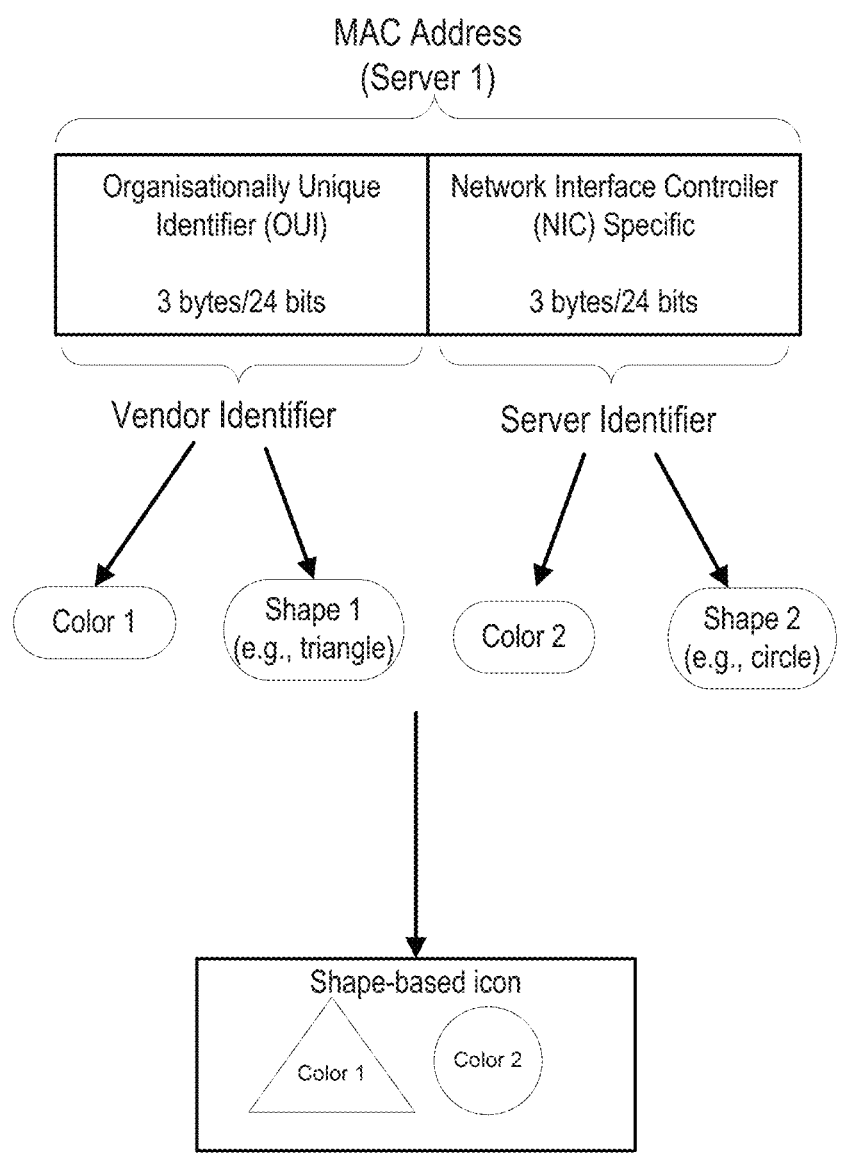
FIG. 3 depicts an example flow diagram illustrating a generation of a shape-based icon representing a MAC address, in accordance with one or more aspects of the present disclosure.

According to aspects of the present disclosure, a MAC address associated with an Ethernet network card of a server is identified. The Ethernet network card MAC address consists of two parts: an organizationally unique identifier (OUI) part and a NIC specific part, as shown in FIG. 3. The OUI part and NIC part are made up of 3 bytes each (i.e., 24 bits each). The OUI part of the MAC address represents information about the hardware vendor associated with the network card. Accordingly, the OUI part of the MAC address represents a vendor identifier. The NIC part of the MAC address represents information specific to the particular NIC associated with the server. Accordingly the NIC part of the MAC address represents a server identifier.

In implementations of the present disclosure, the network management system includes a software module or program (also referred to as the "icon generator") configured to determine a color and a shape based on the vendor identifier associated with a server, as described in detail below with reference to FIGS. 1-4. In addition, the icon generator is configured to determine a color and a shape based on the server identifier associated with the server, as described in detail below with reference to FIGS. 1-4. The multiple shapes filled or colored by their respective colors may be combined to form a shape-based icon to visually represent the server.

Various aspects of the above referenced methods and systems are described in details herein below by way of examples, rather than by way of limitation.

Figure 1:
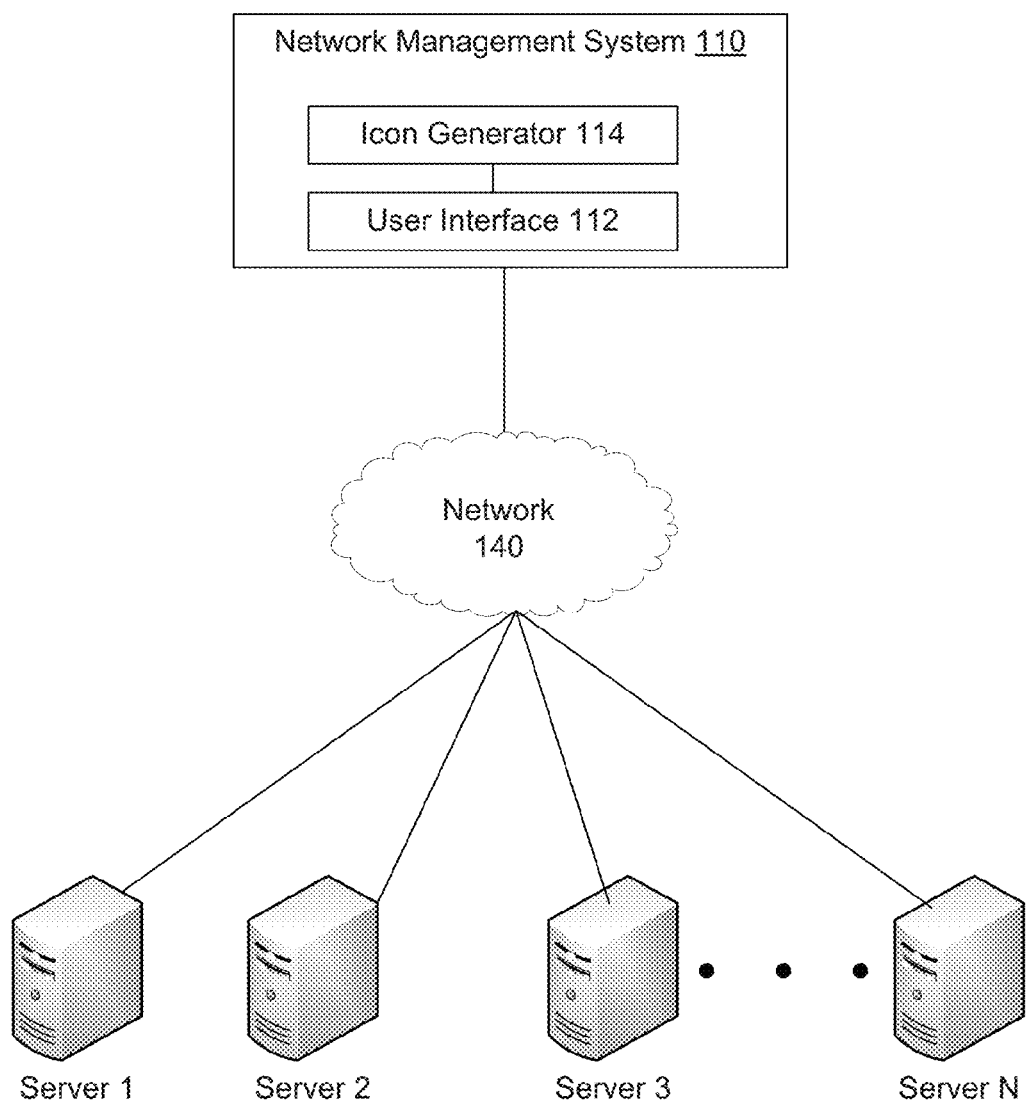
FIG. 1 depicts a high-level component diagram of an example computer system operating in accordance with one or more aspects of the present disclosure.

FIG. 1 depicts a high-level component diagram of an illustrative example of a computing environment 100 including a network management system 110 operatively coupled to multiple components (herein referred to as "servers") of the computing environment 100 via a network 140. The network 140 may be a private network (e.g., a local area network (LAN), a wide area network (WAN), intranet, etc.), a public network, a wireless network, a cellular network, or a combination thereof. The network management system 110 and the servers may be a computing device such as server computer, a desktop computer, or a laptop computer, or a portable computing device such as, but not limited to, mobile telephones, personal digital assistants (PDAs), portable media players, netbooks, tablet computers, portable gaming consoles, portable televisions, electronic book readers, and the like.

As shown in FIG. 1, the network management system 110 is configured to discover any suitable number of servers in the computing environment 100 (e.g., Server 1, Server 2, Server 3, Server N, etc.). Any suitable network device discovery technique may be employed in order to establish communications between the servers including the collection of associated server information.

In an implementation, each server (e.g., Server 1, Server 2, Server 3, and Server N) may include hardware and software configured to providing processing, memory, storage, and other networking functionality. In an implementation, each server includes a memory, a processing device, and one or more NIC components configured to communicate with the network management system 110 via network 140. Any suitable NIC component may be used in accordance with the implementations of the present disclosure, including, but not limited to, an Ethernet network card.

In an implementation, the network management system 110 includes a user interface 112, a memory and one or more processing devices configured to execute an icon generator module 114 (herein referred to as the "icon generator") configured to perform the functions and operations described in detail in connection with FIGS. 1-5. The icon generator 114 can be a software component (e.g., a set of instructions residing in a memory associated with the network management system 110) executable by one or more processing devices associated with the network management system 110 to communicate with the user interface 112 and perform the icon generation activities described herein (e.g., the icon generation activities associated with the systems and methods described in detail in connection with FIGS. 2-5). According to implementations of the present disclosure, the network management system 110 is configured to run on any suitable operating system, such as, for example, a Red Hat Enterprise Linux (RHEL) operating system, a Microsoft Windows® operating system, etc.

According to implementations of the present disclosure, the memory employed by the network management system 110 and the servers may be any suitable computer readable storage medium, including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices.

Figure 2:
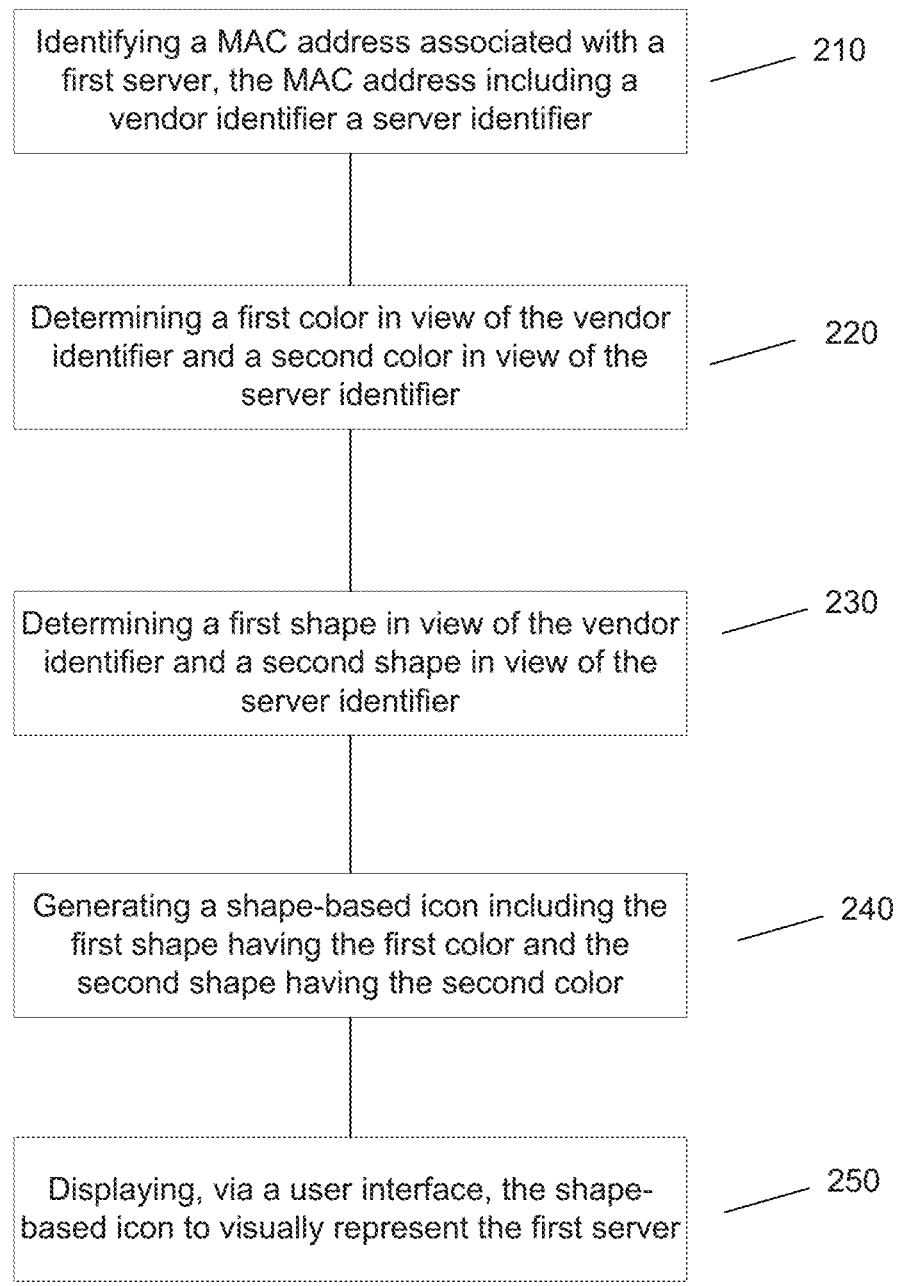
FIG. 2 depicts a flow diagram of a method of providing a shape-based icon visually representing a server via a user interface, in accordance with one or more aspects of the present disclosure.

FIG. 2 depicts a flow diagram of an illustrative example of a method 200 to generate and provide a user interface to display a shape-based icon that visually represents a server in a user interface accessible by an operator, in accordance with one or more aspects of the present disclosure.

Method 200 and/or each of its individual functions, routines, subroutines, or operations may be performed by one or more processing devices of the network management system (e.g., network management system 110 of FIG. 1) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a processing device of the network management system running an icon generator module (e.g., icon generator 114 of FIG. 1) may identify a MAC address associated with a server. The MAC address includes an OUI part (comprising 3 bytes/24 bits) identifying a vendor associated with a NIC card of the server and a NIC specific part (comprising 3 bytes/24 bits) identifying the specific NIC card of the server. The icon generator identifies the OUI part as a vendor identifier and the NIC part as the server identifier.

At block 220, the processing device of the icon generator determines a first color in view of the vendor identifier and a second color in view of the server identifier. In an implementation, since the vendor identifier is 24 bits, a mapping to a corresponding color in the RGB space is determined. The RGB color space includes three chromaticities of the red (R), green (G), and blue (B) primary colors that can produce any chromaticity represented by a triangle defined by the primary colors. Similarly, since the server identifier is 24 bits, a second mapping is performed to a corresponding color in the RGB space.

For example, a server having a MAC address of 52:54:00:cd:4a:01 may be identified. In this example, the vendor identifier is "52:54:00" and the server identifier is "cd:4a:01". In an implementation, the hexadecimal value of the vendor identifier (e.g., 52:54:00) is mapped to a value in the RGB color space.

According to implementations of the present disclosure, the hexadecimal representation of the vendor identifier includes three value pairs (e.g., 52, 54, and 00). The first value pair (e.g., 52) is mapped to a corresponding value in the red (R) color space, the second value pair (e.g., 54) is mapped to a corresponding value in the green (G) color space, and the third value pair (e.g., 00) is mapped to a corresponding value in the blue (B) color space. Accordingly, in this example, for the vendor identifier, R=52, G=54, and B=00.

In implementations of the present disclosure, in block 220, the same process is performed to map the server identifier to a corresponding RGB value. In an implementation, the vendor identifier is comprised of hexadecimal number pairs (e.g., 52, 54, 00, CD, 4A, etc.), wherein a hexadecimal digit (e.g., 0, 1, 2, . . . 9, A, B, C, . . . F=16 alphanumeric values) represents 4 bits and each hexadecimal pair represents 8 bits. For example, a hexadecimal to decimal conversion is employed (e.g., 00=0, 01=1, 52=82, CD=205, FF=255, etc.) In an implementation, 255 represents a highest value represented by the hexadecimal pair (i.e., $2^8$).

In block 230, the processing device of the icon generator determines a first shape to assign to the server in view of the vendor identifier of the MAC address and a second shape to assign to the server in view of the server identifier of the MAC address. Any number of different shape types or permutations may be used in accordance with aspects of the present disclosure. Each of the shape types (herein referred to as "shapes") may be associated with a particular value. For example, a set of four (4) shapes may be used (e.g., a triangle, a square, a circle, and a diamond). Although the example includes a set of four shapes as enumerated, it is noted that any number or types of shapes may be used. In this example, the shapes may be assigned the following shape values: 0=triangle, 1=square, 2=circle, and 3=diamond.

In an implementation, in order to determine a first shape in view of the vendor identifier, the vendor identifier value and server identifier are each converted from hexadecimal scale to decimal scale, as represented by the following expression using the above-identified example:

(#525400)16=(5395456)10

(#cd4a01)16=(13453825)10

In an implementation, the shape value corresponding to the vendor identifier (also referred to as the "first shape value") may be determined using the following expression:

First Shape Value=(Vendor Identifier Value in the Decimal scale)mod(number of shape types in the shape type set);

wherein "mod" represents the "modulo" mathematical operation (i.e., a remainder value after division of one number by another).

Similarly, in an implementation, the shape value corresponding to the server identifier (also referred to as the "second shape value") may be determined using the following expression:

Second Shape Value=(Server Identifier Value in the Decimal scale)mod(number of shape types in the shape type set).

Continuing the example above, the first shape value and second shape value are determined as follows:

First Shape Value=(5395456)mod(4)=0

Second Shape Value=(13453825)mod(4)=1.

In block 230, the icon generator maps the first shape value to a corresponding shape (e.g., the shape value of 0=a triangle) and the second shape value to a corresponding shape (e.g., the shape value of 1=a circle). According to implementations of the present disclosure, alternative mathematical formulas and expressions may be used to determine the shape value and map the shape value to a corresponding shape.

In block 240, the icon generator generates a shape-based icon including the first shape filled, painted, or colored with the first color (e.g., the shape and color determined in view of the vendor identifier) and the second shape filled, painted, or colored with the second color (e.g., the shape and color determined in view of the server identifier). In an implementation, the two shapes (i.e., the first shape and the second shape) may be arranged in a staggered and overlapping manner with the first shape in back and the second shape in front, as shown in the example in FIG. 4. In implementations, any arrangement of the first shape and second shape may be employed in generating the shape-based icon representing the particular server.

In block 250, the shape-based icon may be displayed via a user interface to visually represent the server. In implementations of the present disclosure, the shape-based icon (having two colors and two shapes) is assigned to each unique MAC address and visually identifies individual servers to an operator via a user interface. In implementations, the shape-based icon may be displayed via the user interface of a first computing device or may be sent as a UI document (e.g., a web page) to another device (e.g., an administrator's console) for display to a user (e.g., an administrator).

FIG. 3 illustrates a flow diagram of an exemplary implementation of a method to generate and provide a user interface to display a shape-based icon that visually represents a server. In this example, a server (Server 1) having a MAC address is identified. As shown in FIG. 3, the MAC address of Server 1 includes an OUI part (i.e., the vendor identifier) and a NIC specific part (i.e., the server identifier).

In FIG. 3, the vendor identifier is used to determine a color (i.e., Color 1) and a shape (i.e., Shape 1 corresponding to a triangle), in accordance with the method described above in connection with FIG. 2. In addition, the server identifier is used to determine a color (i.e., Color 2) and a shape (i.e., Shape 2 corresponding to a circle), in accordance with the method described above in connection with FIG. 2. In an implementation, a shape-based icon is formed including Shape 1 filled with Color 1 and Shape 2 filled with Color 2, as shown in FIG. 3.

FIG. 4 illustrates an exemplary user interface including a list of servers represented by their corresponding shape-based icon. As shown in FIG. 4, the user interface displays a list of servers having a shape-based icon 400 representing a same vendor (as identified by the left-most or vendor identifier based shape and color 402 being the same) and an increasing NIC-specific or server-specific number (as identified by the right-most or server identifier based shape and color 404). As shown, the server identifiers (e.g., cd4a01, cd4a02, cd4a03, cd4a04, and cd4a05) are listed in increasing NIC-specific number order.

In addition, the user interface displays a list of servers represented by a shape-based icon 405 representing servers having random or different vendors (as identified by the different left-most shapes and colors 405) and a random NIC-specific or server specific number (as identified by the random and differently formatted and structured server identifiers (e.g., f8aefb, b07a1b, 115e18, and 8fd3aa). As illustrated, an operator may access the user interface and visually determine information about each of the servers on the list. In an example, the operator may determine that the first group of servers is associated with the same vendor in view of the commonly colored triangles based on the vendor identifier.

In an implementation, if a server includes multiple NIC cards, the icon generator may determine a primary NIC card of the multiple NIC cards. The MAC address associated with the primary NIC card may be used to generate the shape-based icon for that particular server, in accordance with the methods and examples described above in connection with FIGS. 1-4.

According to an implementation of the present disclosure, each hardware vendor is associated with its own unique or distinct color and each server is associated with a unique or distinct pair of colors. Accordingly, an operator can identify different servers and different vendors visually based on the shapes and colors of the corresponding shape-based icon. Although in the illustrative examples above, a two-shape model is used to represent the shape-based icon, it is noted that any number of shapes may be combined to form the shape-based icon.

According to implementations of the present disclosure, although the methods and systems describe the use of the MAC address as an input to method to derive the shape-based icon, it is noted that any input having at least a three byte value may be employed. In an example, given a three byte value as an input, the methods and systems of the present disclosure may generate an icon having a color. In another example, given a six byte value as an input, the methods and systems of the present disclosure may generate an icon having two shapes and two colors. Similarly, in another example, given a nine byte value as an input, the methods and systems of the present disclosure may generate an icon having three shapes and three colors.

According to implementations of the present disclosure, a serial number or identifier associated with each server may be used to derive the shape-based icon associated with the server. For example, a server may include a serial number burnt or otherwise included on a motherboard of the server. The serial number may be identified and used to determine one or more colors and one or more shapes to generate a shape-based icon, according to implementations of the present disclosure. In an implementation, depending on the length of the serial number (i.e., the number of digits/characters in the serial number), the methods and systems of the present disclosure may generate multiple shapes, each having a multi-color gradient. For example, a shape-based icon may be generated which includes two shapes, wherein each shape is filled with a two-color gradient.

In an implementation, the shape of the shape-based icon may be filled with a color gradient of any suitable type (e.g., a left to right gradient, a top to bottom gradient, a circle gradient, etc.).

Figure 5:
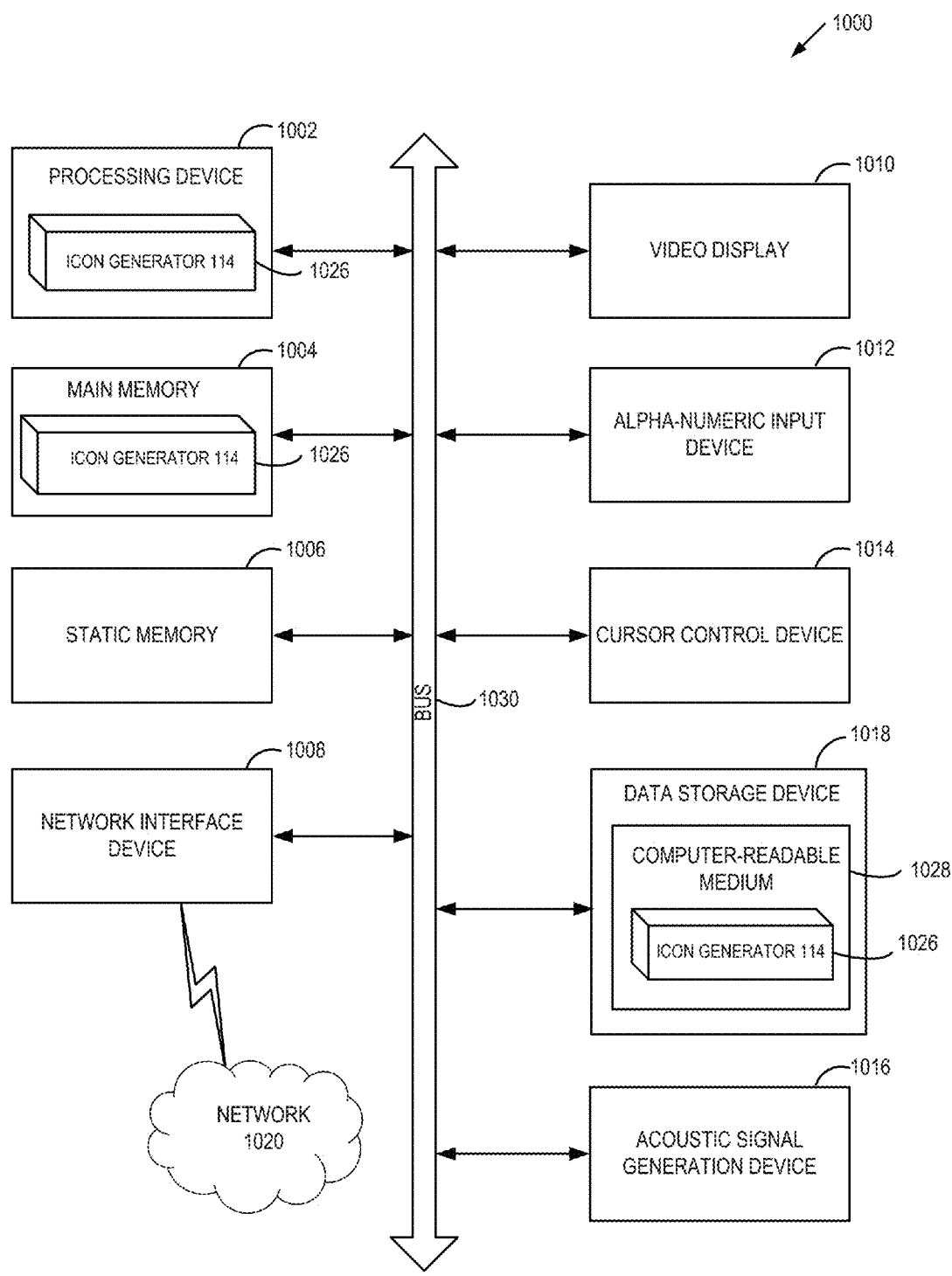
FIG. 5 depicts a block diagram of an example computer system operating in accordance with one or more aspects of the present disclosure.

FIG. 5 schematically illustrates a component diagram of an example computer system 1000 which can perform any one or more of the methods described herein. In various illustrative examples, computer system 1000 may run the icon generator 114 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

"Processor" or "processing device" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute icon generator 114 implementing method 200 to perform icon generation and display.

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) or a block I/O device, such as a disk.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of icon generator 114 implementing method 200 to perform icon generation and user interface provisioning.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "generating," providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
identifying, by a processing device, a media access control (MAC) address associated with a first server, the MAC address comprising a vendor identifier comprising a first hexadecimal value and a server identifier;
converting the first hexadecimal value of the vendor identifier to a first decimal value;
mapping the first decimal value of the vendor identifier of the MAC address to a corresponding first value on a red, blue, green (RGB) scale to determine a first color;
determining a second color in view of the server identifier;
determining a first shape in view of the vendor identifier and a second shape in view of the server identifier;
generating a shape-based icon comprising the first shape having the first color and the second shape having the second color; and
providing a user interface to display the shape-based icon that visually represents the first server.

2. The method of claim 1, wherein the vendor identifier comprises an organizationally unique identifier (OUI) part of the MAC address, and wherein the server identifier comprises a network interface controller (NIC) part of the MAC address.

3. The method of claim 2, further comprising converting a second hexadecimal value of the NIC part of the MAC address to a second decimal value.

4. The method of claim 3, further comprising mapping the second decimal value of the NIC part of the MAC address to a corresponding second value on the red, blue, green (RGB) scale to determine the second color.

5. The method of claim 1, wherein the first server comprises a plurality of network interface controller (NIC) cards.

6. The method of claim 5, further comprising determining a primary NIC card of the first server, wherein the MAC address is associated with the primary NIC card.

7. The method of claim 1, wherein the first shape and the second shape are selected from a shape type set comprising a plurality of different shape types.

8. A system comprising:
a memory; and
a processing device operatively coupled to the memory, the processing device to:
identify, by the processing device, a media access control (MAC) address associated with a first server, the MAC address comprising a vendor identifier comprising a first hexadecimal value and a server identifier;
convert the first hexadecimal value of the vendor identifier to a first decimal value;

map the first decimal value of the vendor identifier of the MAC address to a corresponding first value on a red, blue, green (RGB) scale to determine a first color;

determine a second color in view of the server identifier;

determine a first shape in view of the vendor identifier and a second shape in view of the server identifier;

generate a shape-based icon comprising the first shape having the first color and the second shape having the second color; and provide a user interface to display the shape-based icon that visually represents the first server.

9. The system of claim 8, wherein the vendor identifier comprises an organizationally unique identifier (OUI) part of the MAC address, and wherein the server identifier comprises a network interface controller (NIC) part of the MAC address.

10. The system of claim 9, the processing device to convert a second hexadecimal value of the NIC part of the MAC address to a second decimal value.

11. The system of claim 10, the processing device to map the second decimal value of the NIC part of the MAC address to a corresponding second value on the red, blue, green (RGB) scale to determine the second color.

12. The system of claim 8, wherein the first server comprises a plurality of network interface controller (NIC) cards.

13. The system of claim 12, the processing device to determine a primary NIC card of the first server, wherein the MAC address is associated with the primary NIC card.

14. The system of claim 8, wherein the first shape and the second shape are selected from a shape type set comprising a plurality of different shape types.

15. A non-transitory computer-readable storage medium comprising executable instructions that, when executed by a processing device, cause the processing device to:

determine, by the processing device, a primary network interface controller (NIC) card of a plurality of NIC cards of a first server;

identify, by the processing device, a media access control (MAC) address associated with the primary NIC card of the first server, the MAC address comprising a vendor identifier comprising a first hexadecimal value and a server identifier;

convert the first hexadecimal value of the vendor identifier to a first decimal value;

map the first decimal value of the vendor identifier of the MAC address to a corresponding first value on a red, blue, green (RGB) scale to determine a first color;

determine a second color in view of the server identifier determine a first shape in view of the vendor identifier and a second shape in view of the server identifier;

generate a shape-based icon comprising the first shape having the first color and the second shape having the second color; and provide a user interface to display the shape-based icon that visually represents the first server.

16. The non-transitory computer-readable storage medium of claim 15, wherein the vendor identifier comprises an organizationally unique identifier (OUI) part of the MAC address, and wherein the server identifier comprises a network interface controller (NIC) part of the MAC address.

17. The non-transitory computer-readable storage medium of claim 16, the processing device to convert a second hexadecimal value of the NIC part of the MAC address to a second decimal value.

18. The non-transitory computer-readable storage medium of claim 17, the processing device to map the second decimal value of the NIC part of the MAC address to a corresponding second value on the red, blue, green (RGB) scale to determine the second color.

19. The non-transitory computer-readable storage medium of claim 15, wherein the first shape and the second shape are selected from a shape type set comprising a plurality of different shape types.

20. The non-transitory computer-readable storage medium of claim 15, wherein the user interface displays a plurality of unique shape-based icons each associated with a respective server of a plurality of servers.

* * * * *